(12) United States Patent
Furuichi et al.

(10) Patent No.: US 7,932,499 B2
(45) Date of Patent: Apr. 26, 2011

(54) RADIATION DETECTOR AND METHOD FOR PRODUCING THE SAME

(75) Inventors: Shinji Furuichi, Mohka (JP); Hideo Nitta, Mohka (JP)

(73) Assignee: Hitachi Metals, Ltd., Tokyo (JP)

( * ) Notice: Subject to any disclaimer, the term of this patent is extended or adjusted under 35 U.S.C. 154(b) by 546 days.

(21) Appl. No.: 11/997,561

(22) PCT Filed: Mar. 13, 2006

(86) PCT No.: PCT/JP2006/304866
§ 371 (c)(1),
(2), (4) Date: Feb. 1, 2008

(87) PCT Pub. No.: WO2007/105288
PCT Pub. Date: Sep. 20, 2007

(65) Prior Publication Data
US 2010/0219349 A1 Sep. 2, 2010

(51) Int. Cl.
*G01T 1/20* (2006.01)
(52) U.S. Cl. ....................................................... 250/366
(58) Field of Classification Search ................... 250/366
See application file for complete search history.

(56) References Cited

U.S. PATENT DOCUMENTS

| | | | | |
|---|---|---|---|---|
| 6,495,845 B1 * | 12/2002 | Tsunota et al. | ............. | 250/505.1 |
| 2002/0011572 A1 | 1/2002 | Kajiwara et al. | | |
| 2005/0111613 A1 * | 5/2005 | Mliner et al. | ................... | 378/19 |

FOREIGN PATENT DOCUMENTS

| | | | |
|---|---|---|---|
| JP | 5-264789 A | | 10/1993 |
| JP | 8-122492 A | | 5/1996 |
| JP | 11-186532 A | | 7/1999 |
| JP | 2000180555 A | * | 6/2000 |
| JP | 2002-116261 A | | 4/2002 |
| JP | 2002-139568 A | | 5/2002 |
| JP | 2002-365393 A | | 12/2002 |
| JP | 2003-28986 A | | 1/2003 |
| JP | 2004-151007 A | | 5/2004 |
| JP | 2004151007 A | | 5/2004 |
| JP | 2005-87366 A | | 4/2005 |
| JP | 2005087366 A | | 4/2005 |

OTHER PUBLICATIONS

Chinese Office Action dated Jul. 9, 2010 with English translation.

* cited by examiner

*Primary Examiner* — David P Porta
*Assistant Examiner* — Kiho Kim
(74) *Attorney, Agent, or Firm* — Sughrue Mion, PLLC

(57) ABSTRACT

Disclosed is a multi-channel array radiation detector that can provide high-definition and high-resolution CT photo-images. The radiation detector has semiconductor photo-detecting elements arranged lengthwise and breadth-wise in a lattice manner and scintillator elements arranged on them one-to-one. The scintillator elements have thin metal light-reflecting material layers formed on side surfaces of the scintillator elements, and a radiation shielding material layer composed of resin blended with heavy metal element particles is filled in between adjacent metal light-reflecting material layers.

4 Claims, 5 Drawing Sheets

RADIATION DETECTOR AND METHOD FOR PRODUCING THE SAME

TECHNICAL FIELD

The present invention relates to a multi-channel array radiation detector suitable for use in a radiation CT device, specifically an X ray CT device, and in particular to a structure of the scintillator thereof.

BACKGROUND ART

The radiation CT device enables tomogram to be obtained in a shorter time as compared to a case when an MRI or a PET (Positron Emission Tomography) is used. In order to provide a high-definition and high-resolution image by expanding the feature further, a radiation detector having a structure of multi-channel array has been gradually used. In the radiation CT device, a plurality of radiation detectors are placed in an arc shape at opposite side of a radiation source with respect to an object to be photographed. For a single channel array radiation detector, in each radiation detector, eight or sixteen radiation detecting elements are arranged lengthwise or breadth-wise. For a multi-channel array radiation detector, for example, sixty four and sixteen radiation detecting elements are arranged lengthwise and breadth-wise, respectively, in a lattice manner. By replacing a single channel array radiation detector in which radiation detecting elements are arranged in one line with an m multi-channel array radiation detector in which radiation detecting elements are arranged in m lines, inspection time can be shortened, and high-resolution and high-definition tomogram can be provided.

Since in the multi-channel array radiation detector, for example, 1024 radiation detecting elements are arranged in sixteen columns by sixty four rows for a radiation detector, the size of the radiation detecting elements to be used becomes small. Moreover, the gap between neighboring radiation detecting elements becomes small. By the reason, the scintillator element of each radiation detecting element becomes small, resulting in a small gap between neighboring scintillator elements.

In the multi-channel array radiation detector, since individual radiation detecting elements become small, in order to prevent light scintillated by a scintillator element from emitting through the side surfaces of the scintillator element, and prevent the output from lowering, it is necessary to dispose a light-reflecting material having high light-reflectivity to the side surfaces of the scintillator element. Moreover, in order to prevent image broadening because of the fact that radiation that has passed through the neighboring scintillator element comes into another scintillator element, and to provide a high-definition image, it is necessary to provide a radiation shielding material close to the side surfaces of the scintillator element.

As the scintillator element becomes small, the gap between neighboring scintillator elements should be small, and it has been difficult to interpose a radiation shielding plate between light-reflecting materials disposed on the side surfaces of the scintillator element.

In the radiation detector, a radiation shielding plate made of heavy metal element, such as tungsten or lead, is interposed between the scintillator elements to prevent cross-talk. Further, the detection efficiency is enhanced with a light-reflecting material filled in between the scintillator element and the radiation shielding plate, because, among light scintillated by the scintillator element, light that has leaked around the scintillator element returns into the scintillator element.

As the light reflecting material, a resin such as epoxy and polyester blended with white pigment such as titanium oxide powder is usually used, and the light reflecting material has light-reflectivity of around 90%. However, if light scintillated by the scintillator element is emitted from the side surface of the scintillator element into the light-reflecting material, it is attenuated by resin contained in the light-reflecting material. Due to the attenuation, sensitivity of the radiation detector is lowered, thereby, in order to compensate the attenuation, it has been necessary to use white pigment having high light-reflectivity.

Moreover, since the light-reflecting material that is a resin blended with white pigment is pretty thick as at least 100 μm, the radiation shielding plate is apart by the light-reflecting material thickness from the side surface of the scintillator element. Since the radiation shielding plate is apart from the side surface of the scintillator element, sometimes, radiation incident at low angle (a small angle with respect to the side surface of the scintillator element) may be shielded by the radiation shielding plate, but radiation passing only through the light-reflecting material comes into the scintillator element.

If, in order to shield radiation incident at low angle, a radiation shielding plate made of a heavy metal element plate with a thickness near the gap between the scintillator elements is used, the thickness of the light-reflecting material should be thin, thereby, the warping of the radiation shielding plate cannot be absorbed by the light-reflecting material. By the reason, it becomes difficult to assemble the scintillator elements by arranging them lengthwise and breadth-wise in high accuracy through a small gap. The problem becomes notable when, as the multi-channel array radiation detector, the gap width between the scintillator elements is narrow.

It is proposed in Patent Documents 1 to 4 to use resin blended with heavy metal element powder as the radiation shield material, in place of the heavy metal element plate. Consideration to use the resin blended with heavy metal element powder as the radiation shield material filled between the scintillator elements of the radiation detector, has led to the present invention.

Patent Document 1: Japanese Laid-Open Patent Hei 5-264789
Patent Document 2: Japanese Laid-open Patent Hei 8-122492
Patent Document 3: Japanese Laid-open Patent 2002-365393
Patent Document 4: Japanese Laid-open Patent 2003-28986

DISCLOSURE OF THE INVENTION

Problems to be Solved by the Invention

An object of the present invention is to provide a structure of a radiation detector that has very small gaps between scintillator elements and is suitable for a multi-channel array radiation detector for a radiation CT device.

Another object of the present invention is to provide a radiation detector, in which a radiation shielding material is filled in the gaps between the scintillator elements and extremely close to side surfaces of the scintillator elements to reduce radiation incident through the side surfaces of the scintillator elements.

Further, the present invention provides a radiation detector, in which a light-reflecting material layer that has high light reflection efficiency with respect to light scintillated by the scintillator elements is arranged on the side surfaces of the scintillator elements to enhance detection efficiency to radiation.

Further, the present invention provides a manufacturing method of a radiation detector, in which scintillator elements are arranged with high precision in the detector.

Means for Solving the Problems

A radiation detector according to the present invention, contains:
a semiconductor photo-detecting element array having a plurality of semiconductor photo-detecting elements arranged lengthwise and breadth-wise on a plane;
a plurality of scintillator elements arranged on the semiconductor photo-detecting element array to have bottoms of the scintillator elements each fixed to each of the plurality of semiconductor photo-detecting elements;
a first light-reflecting material layer coating a top of each of the scintillator elements opposite to the bottom;
second light-reflecting material layers composed of metal layers covering side surfaces of each of the scintillator elements; and
a radiation shielding material layer composed of resin and particles of a heavy metal element blended in the resin, which radiation shielding material layer is filled between adjacent second light-reflecting material layers covering the side surfaces of the scintillator elements arranged to neighbor on each other.

In the radiation detector of the present invention, it is preferable that the second light-reflecting material layer is made of gold, silver, copper, aluminum or alloy thereof. Also, the second light-reflecting material layer is preferably 0.05 μm to 5 μm thick. And, the second light-reflecting material layer is preferably formed by sputtering or vapor-deposition on the side surfaces of the scintillator elements. And, the second light-reflecting material layer has preferably light-reflectivity of more than 88% with respect to visible radiation.

In the radiation detector of the present invention, the radiation shielding material layer may consist essentially of 90 wt. % or more of the particles of a heavy metal element selected from Nb to Bi in the Periodic Table and the rest being resin. And, it is preferable that a region of the radiation shielding material layer, which interposes between two adjacent second light-reflecting material layers covering the side surfaces of the scintillator elements neighboring on each other, contains the particles of a heavy metal element that consist of at least three particles of a heavy metal element having diameters within +/−3 μm of a gap width between the two adjacent second light-reflecting material layers and the rest of the particles of a heavy metal element having diameters less than those of the at least three particles of a heavy metal element.

In the radiation detector of the present invention, the first light-reflecting material layer may be resin blended with titanium oxide powder.

A method for producing a radiation detector according to the present invention, comprises the steps of:
providing a semiconductor photo-detecting element array that has a plurality of semiconductor photo-detecting elements arranged lengthwise and breadth-wise on a plane, and a plurality of scintillator plates that have a thickness equivalent to one of lengthwise and breadth-wise dimensions of the semiconductor photo-detecting elements disposed in the semiconductor photo-detecting element array, a length more than the other of the lengthwise and breadth-wise dimensions of the semiconductor photo-detecting elements and a width more than a height of scintillator elements to be completed;
sputtering or vapor-depositing gold, silver, copper, aluminum or alloy thereof on both sides of the scintillator plates to form second light-reflecting material layers of 0.05 μm to 5 μm thick on the both sides;
plastering a radiation shielding material composed of resin blended with particles of a heavy metal element on one of the second light-reflecting material layers formed on the both sides of the scintillator plates;
piling the scintillator plates plastered with the radiation shielding material to alternate the scintillator plates with the radiation shielding material, and curing the radiation shielding material to form radiation shielding material layers and to form scintillator blocks having thickness equivalent to one of lengthwise and breadth-wise dimensions of the semiconductor photo-detecting element array;
slicing the scintillator blocks into sliced pieces with length equivalent to the other of the lengthwise and breadth-wise dimensions of the semiconductor photo-detecting elements and width more than the height of the scintillator elements to be completed;
sputtering or vapor-depositing gold, silver, copper, aluminum or alloy thereof on both cut sides of the sliced pieces made from the scintillator blocks to form other second light-reflecting material layers of 0.05 μm to 5 μm thick on the both cut sides;
plastering a radiation shielding material composed of resin blended with particles of a heavy metal element on one of the other second light-reflecting material layers formed on the both cut sides of the sliced pieces;
piling the sliced pieces plastered with the radiation shielding material to alternate the sliced pieces with the radiation shielding material, and curing the radiation shielding material to form radiation shielding material layers and to form a scintillator element block having the length equivalent to the other of the lengthwise and breadth-wise dimensions of the semiconductor photo-detecting element array; and
polishing both end faces (top and bottom) of the scintillator element block to the height of the scintillator elements to be completed and fixing one of polished end faces of the scintillator element block to the semiconductor photo-detecting element array so that each of the scintillator elements faces each of the semiconductor photo-detecting elements.

The method for producing a radiation detector may further comprise the steps of:
after the polishing of the both end faces of the scintillator element block, plastering a second light-reflecting material composed of resin blended with titanium oxide powder on other faces of the scintillator element block except for a face adhering to the semiconductor photo-detecting element array and curing the second light-reflecting material to form a second light-reflecting material layer.

Among radiation incident into a scintillator element, there are one incident through a top of the scintillator element and one incident through side surfaces of the scintillator element. It is preferable that the scintillator elements receive only radiation incident through the tops of the scintillator elements and that a radiation shielding material layers are formed on the side surfaces of the scintillator elements so as to prevent radiation from coming through the side surfaces. The radiation coming into a scintillator element through side surfaces of the scintillator element can be divided into one that passes through another scintillator element neighboring the scintillator element and comes into the scintillator element to scintillate in it and one that comes into the scintillator element through a light-reflecting layer formed between the scintillator element and a radiation shielding material. The increment in scintillation of the scintillator element caused by radiation passing through a neighboring scintillator element and coming into the scintillator element to scintillate is usually called "cross-talk". The radiation coming through the side surfaces of a scintillator from a top of the light-reflection layer is named as "radiation incident at low angle" here. Any radiation coming through the side surfaces of the scintillator element tends to broaden photo-images of a CT device and is hurtful to high-definition and high-resolution in the photo-images.

Solid metal elements from Nb to Bi in the Periodic Table are usable for heavy metal element particles contained in the radiation shielding material layer in the radiation detector of the present invention because of their large radiation shielding effect, and in particular, Nb, Mo, Ag, Sn, Sb, W, Au, Pb and Bi are suitable. Since the radiation shielding material layer is a mixture of 90 wt. % or more of the heavy metal element particles blended in the rest of resin, that is, thermoplastic resin or thermosetting resin, the radiation passing through the radiation shielding material layer attenuates by 90% or more because of the heavy metal element particles contained and cross-talk caused by radiation passing and coming through a neighboring scintillator element can be lowered.

The light-reflecting material layer disposed between the side surface of the scintillator element and the radiation shielding material layer is 0.05 µm to 5 µm thick in the radiation detector of the present invention, and it is very thin in comparison with a conventional light-reflecting material that is a mixture of white pigment, such as titanium oxide powder, and resin. By the reason, the radiation shielding material layer is disposed extremely close to the side surface of the scintillator element to prevent the radiation incident at low angle. Since the radiation coming through the side surfaces of the scintillator element is shielded in the radiation detector of the invention, a radiation CT device using the radiation detector can provide high-definition photo-images with high-resolution.

The heavy metal element particles contained in the radiation shielding material layer are a mixture of coarser particles and finer particles, and it is preferable that at least three coarser particles exist for a scintillator element. When the coarser heavy metal element particles have a diameter within +/−3 µm of a gap width between the two adjacent second light-reflecting material layers, the gap width can be kept uniform.

A second light-reflecting material layer with a thickness of 0.05 µm to 5 µm that is made of gold, silver, copper, aluminum or alloy thereof is formed on a side surface of the scintillator element by vapor-deposition or sputtering. Since the second light-reflecting material layer is formed directly on the side surface of the scintillator element, the light emitted from the side surface of the scintillator element is not absorbed by a resin which was traditionally contained in a conventional light-reflecting material layer and not attenuated, and even when the second light-reflecting material layer has light-reflectivity less than 90%, it is enough to satisfy the quality. It is useful when the light-reflectivity is more than 88%.

Since the second light-reflecting material layer is formed by vapor-deposition or sputtering, its thickness can be precisely controlled.

The thickness of the second light-reflecting material layer can be precisely controlled, and since thickness of the radiation shielding material layer can be determined by diameters of at least three coarser heavy metal element particles contained in the radiation shielding material layer for one of the scintillator elements in addition, the radiation detecting device of the present invention can be manufactured with a desirably precise gap width between the scintillator elements. By the reason, we can provide a radiation detector, in which a plurality of scintillator elements are arranged lengthwise and breadth-wise with appropriate precision.

Advantages of the Invention

In the radiation detector of the present invention, the thickness of the light-reflecting material layers formed on the side surfaces of the scintillator elements is thin and precise. Also, since the thickness of the radiation shielding material layers disposed between the adjacent light-reflecting material layers can be precisely controlled, the radiation detector has a structure suitable for a multi-channel radiation detector for a radiation CT, which scintillator element gaps are small.

Also, since the radiation detector of the present invention has extremely thin light-reflecting material layers formed on the side surfaces of the scintillator elements, and since the radiation shielding material layers are disposed extremely close to the side surfaces of the scintillator elements, both cross-talk and radiation incident at low angle can be reduced, and high-definition CT photo-images with high-resolution can be provided.

Further, since the metal light-reflecting material layer with high light-reflectivity is formed directly on the side surfaces of the scintillator elements, the sensitivity of the radiation detector has been enhanced.

Further, since the thickness of the light-reflecting material layers and the radiation shielding material layers formed between the scintillator elements can be precisely controlled, the scintillator elements can be arranged lengthwise and breadth-wise in a lattice manner according to the method for producing the radiation detector of the present invention.

BRIEF DESCRIPTION OF DRAWINGS

FIG. 5 is explanatory views of devices for detecting radiation incident at low angle, of which

FIG. 7 is explanatory views of a manufacturing process of the radiation detector of EXAMPLE 1 of the present invention shown in FIG. 1, in which

Figure 1:
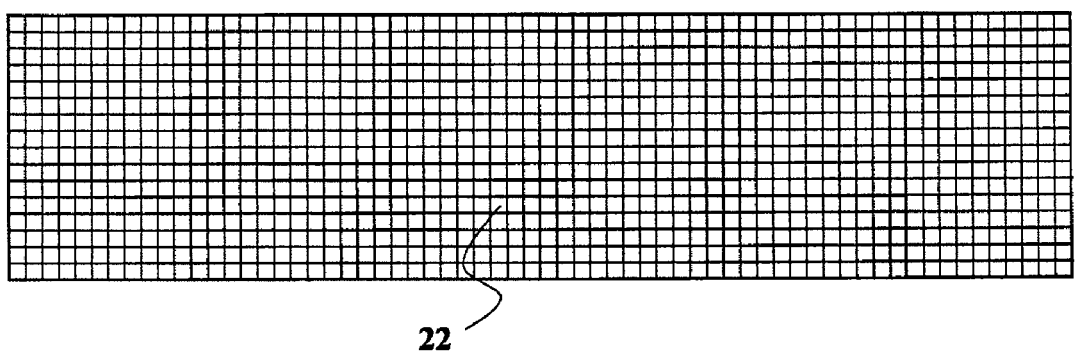
FIG. 1 is a plan view showing a radiation detector of EXAMPLE 1 according to the present invention, which shows a top plan view of the radiation detector with first light-reflecting material layers removed.

EXPLANATION OF REFERENCE NUMERALS 10 semiconductor photo-detecting element array
15 semiconductor photo-detecting element
20 scintillator plate
20a scintillator block
20b sliced piece
20c scintillator element block
22 scintillator element
24 bottom
26 top
28 side surface
30 first light-reflecting material layer
40 second light-reflecting material layer
50, 50a, 50b radiation shielding material layer
50a', 50b' radiation shielding material

BEST MODE FOR CARRYING OUT OF THE INVENTION

Figure 2:
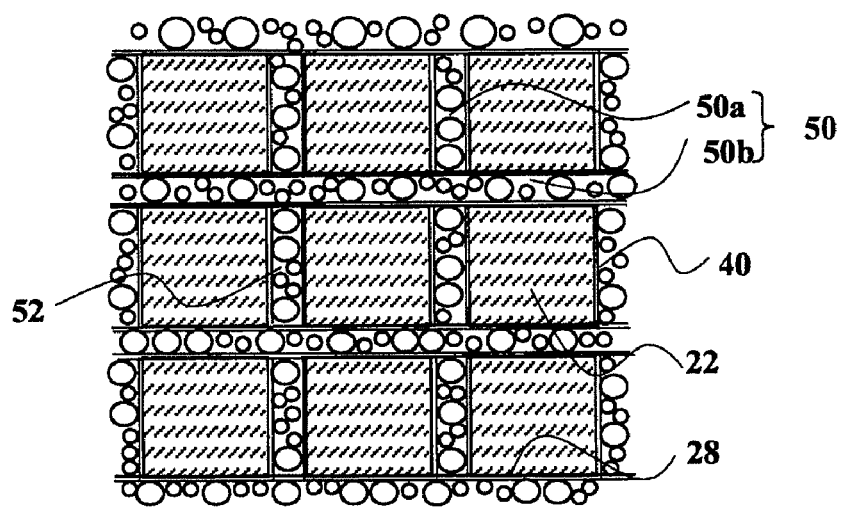
FIG. 2 is a partially enlarged top plan view of the radiation detector of EXAMPLE 1 of the present invention shown in FIG. 1.
Figure 3:
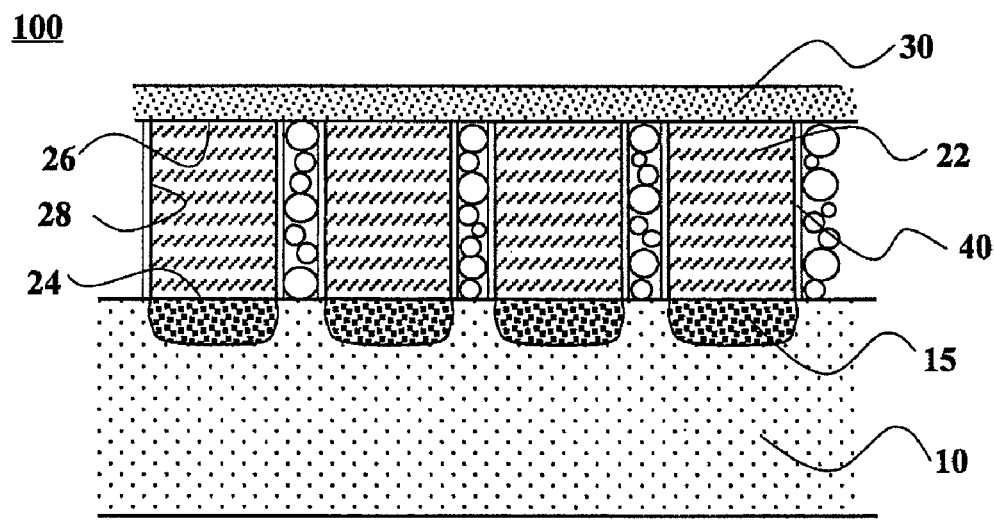
FIG. 3 is an enlarged longitudinally cross-sectional view of the radiation detector shown in FIG. 2.
Figure 4:
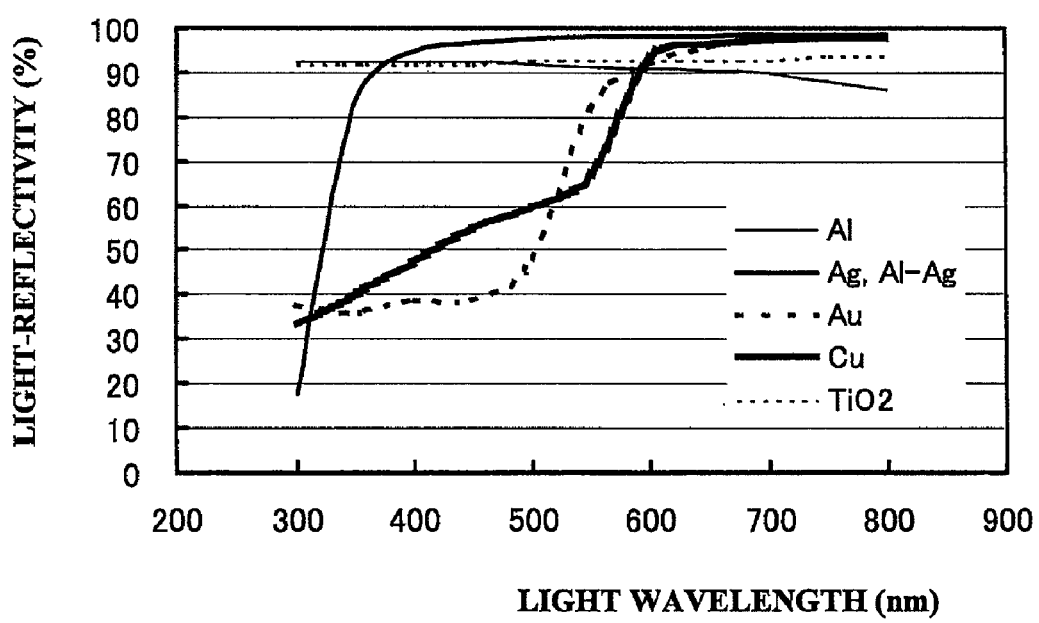
FIG. 4 is a graph showing light reflectivity of various light-reflecting material layers with respect to light wavelength.
Figure 5A:
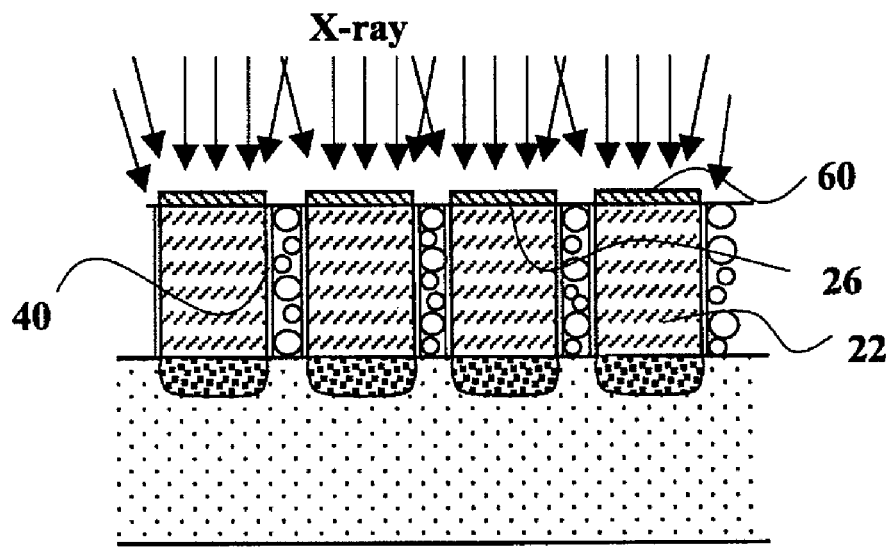
FIG. 5A shows a device for detecting only radiation incident at low angle.
Figure 5B:
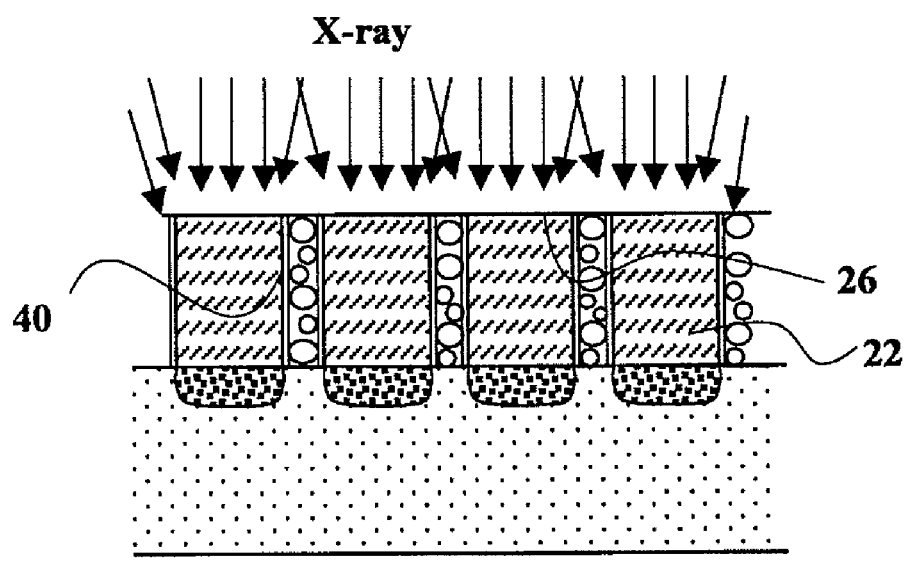
FIG. 5B shows a device for detecting both radiation incident from tops of scintillator elements and radiation incident at low angle.
Figure 6:
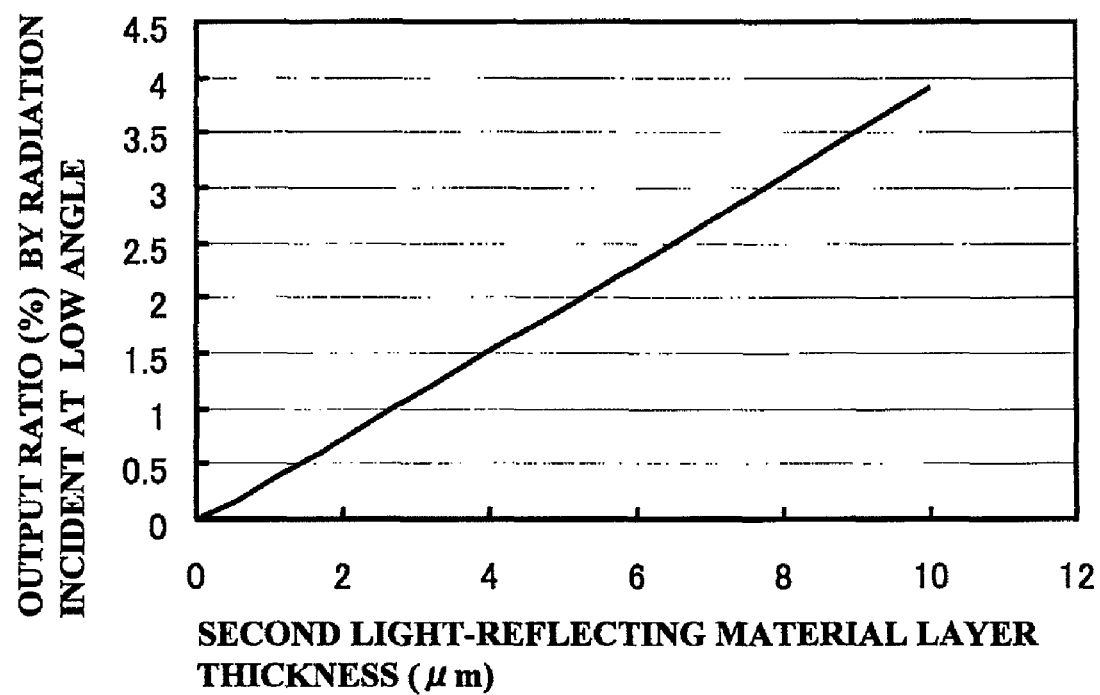
FIG. 6 is a graph showing an output ratio by radiation incident at low angle with respect to second light-reflecting material layer thickness.

Referring to the drawings, the radiation detector of EXAMPLES of the present invention will be described in detail below. FIGS. 1 through 3 show the radiation detector of EXAMPLE 1 of the present invention, that is, FIG. 1 is a top plan view of the radiation detector with a first light-reflecting material layer of the top removed, FIG. 2 is a partially enlarged top plan view of the radiation detector shown in FIG. 1, and FIG. 3 is a partially enlarged longitudinally cross-sectional view of the radiation detector. FIG. 4 is a graph of light-reflectivity of various light-reflecting material layers with respect to light wavelength. FIG. 5 is explanatory views of devices for detecting radiation incident at low angle for the radiation detector having radiation shielding material layers of resin blended with heavy metal element particles, and FIG. 6 is a graph showing an output ratio by radiation incident at low angle vs. second light-reflecting material layer thickness measured by the device for detecting radiation incident at low angle shown in FIG. 5. And, FIG. 7 is explanatory views of a manufacturing process of the radiation detector of the present invention, which will be described in EXAMPLE 1.

EXAMPLE 1

Referring to FIGS. 1 to 3, the radiation detector 100 of the present invention, has a semiconductor photo-detecting element array 10 having semiconductor photo-detecting elements 15 arranged lengthwise and breadth-wise on a plane. The radiation detector 100 has, for example, a lengthwise dimension of 75 mm and a breadth-wise dimension of 23 mm, and in which 1024 pieces of semiconductor photo-detecting elements 15 are arranged lengthwise in sixty four columns and breadth-wise in sixteen rows in a lattice manner. On the semiconductor photo-detecting element array 10, a plurality of scintillator elements 22 each having a bottom 24 adhered to each semiconductor photo-detecting element 15 are arranged. The scintillator elements 22 are made of $Gd_2O_2S$:Pr (Ce, F), and mainly scintillate light having a wavelength of 512 nm. Since the scintillator elements 22 and the semiconductor photo-detecting elements 15 are arranged one-to-one, 1024 pieces of the scintillator elements are also arranged lengthwise in sixty four columns and breadth-wise in sixteen rows in a lattice manner. Here, the scintillator element has a lengthwise dimension of 1.07 mm and a breadth-wise dimension of 1.14 mm, the gap between the scintillator elements has a lengthwise dimension of about 100 μm and a breadth-wise dimension of 297 μm, and the scintillator element has a height of 1.5 mm.

The top 26 of the scintillator element 22 opposite to the bottom 24 is coated with a first light-reflecting material layer 30 composed of a polyester resin blended with titanium oxide powder. Side surfaces 28 of each scintillator element 22 are covered with a second light-reflecting material layer 40 composed of pure aluminum formed with a thickness of 2 μm by sputtering. The light-reflectivity of the second light-reflecting material layer 40 with respect to visible radiation was about 90%.

Between the second light-reflecting material layers 40 disposed to the side surfaces 28 of the scintillator element 22, a polyester resin blended with heavy metal element particles (e.g. niobium particles) is filled as a radiation shielding material layer 50. Here, the radiation shielding material layer 50 extending lengthwise of the radiation detector 100 is referred to as a first radiation shielding material layer 50a, and the radiation shielding material layer 50 extending breadth-wise of the radiation detector 100 is referred to as a second radiation shielding material layer 50b.

The dimensions of the first radiation shielding material layer 50a are 75 mm length×293 μm thickness×1.5 mm height. Per one layer of the first radiation shielding material layers 50a, about 10 mg of polyester resin blended with 190 mg of niobium particles, i.e. the total of 320 niobium particles (39 mg) and 151 mg of niobium particles having diameters less than those of former niobium particles is used so that five niobium particles 52 having diameters of 290 μm to 296 μm exist for each of the scintillator elements, and the content of the niobium particles in the first radiation shielding material layer is 93 wt. % to 96 wt. %.

The dimensions of the second radiation shielding material layer 50b are 23 mm length×96 μm thickness×1.5 mm height. Per one layer of the second radiation shielding material layers 50b, about 1.1 mg of polyester resin blended with 20.6 mg of niobium particles, i.e. the total of eighty niobium particles (0.36 mg) and 20.24 mg of niobium particles having diameters less than those of the former niobium particles is used so that five niobium particles 52 having diameters of 93 μm to 99 μm exist for each of the scintillator elements, and the content of the niobium particles in the second radiation shielding material layer is 93 wt. % to 96 wt. %.

In the radiation shielding material layer, 90 wt. % or more of heavy metal element particles are contained in a resin. Since the specific gravity of niobium is 8.56, and the specific gravity of the polyester resin is about 1.5, when 90 wt. % or more of niobium particles are contained in the polyester resin, the volume ratio of the niobium particles is about 60%. By the reason, the radiation passing through the radiation shielding material layer attenuates by 90% or more because of heavy metal element particles contained therein, thereby the crosstalk becomes small.

Containing heavy metal element particles in the radiation shielding material layer as much as possible, enhances the effect of shielding radiation. However, it is preferable to contain at least 1 wt. % of resin. If the content of the resin is less than 1 wt. %, it is difficult to plaster the radiation shielding material on the second light-reflecting material layer.

It is preferable for the heavy metal element particles contained in the radiation shielding material layer to be a mixture of coarser particles and finer particles, instead of having a uniform particle size. It is preferable that among the heavy metal element particles, at least three coarser particles exist for a scintillator element. It is preferable for the heavy metal element particles to have diameters being within 2 μm below a gap width between the neighboring second light-reflecting material layers. Existence of at least three coarser particles between second light-reflecting material layers of the neighboring scintillator elements enables a uniform gap width between the scintillator elements to be ensured. And, the rest of the heavy metal element particles has a diameter being smaller than the diameter of the coarser heavy metal element particles, thereby, the rest of the heavy metal element particles are positioned in the gaps between the coarser heavy metal element particles to enhance the radiation shielding effect.

In the radiation detecting device of the present invention, thin metal light-reflecting material layers are disposed on side surfaces of the scintillator elements, and a radiation shielding material layer blended with heavy metal element particles is disposed between adjacent light-reflecting material layers. It is preferable that the light-reflecting material layer is made of gold, silver, copper, aluminum or alloy thereof and has a thickness of 0.05 μm to 5 μm. Since the light-reflecting material layer has such a thin thickness, the radiation shielding material layer can be disposed extremely close to the side surface of the scintillator element, resulting in a large shielding effect also with respect to the radiation incident at low angle.

Metal elements except for aluminum among gold, silver, copper, aluminum or alloy thereof constituting the light-reflecting material layer, are elements each having a relatively large atomic number, and have a large radiation absorbing effect. By the reason, the light-reflecting material layer also acts as a radiation shielding material. Since even if the radiation shielding efficiency of the material is low, the thickness of the light-reflecting material layer is thin, the radiation shielding material layer blended with heavy metal element particles can be disposed extremely close to the scintillator element, thereby, enabling the radiation incident at low angle to be shielded.

Moreover, as described below, since the light-reflectivity with respect to visible radiation of gold, silver, copper, aluminum or alloy thereof constituting the light-reflecting material layer is more than 88%, among light scintillated by the scintillator element, more than 88% of light emitted outside from the side surfaces of the scintillator element is returned to the scintillator element and comes into the semiconductor photo-detecting element to be converted into electric signals.

As mentioned above, the radiation detector of the present invention has large capability for shielding disturbing radiation by a radiation shielding material and small cross-talk. Also, it has a high signal output because of the high light-reflecting efficiency of the light-reflecting material layer on the side surface of the scintillator element. By the reason, use of the radiation detector of the present invention in a radiation CT enables high-definition images with high-resolution to be obtained.

Moreover, since the light-reflecting material layer is formed by vapor-deposition or sputtering, a precise thickness of the light-reflecting material layer can be obtained. In addition, since the thickness of the radiation shielding material layer is controlled with respect to the diameter of the coarser heavy metal element particles, a precise thickness of the radiation shielding material layer can be obtained. By the reason, the gap width between the scintillator elements can be manufactured precisely.

EXAMPLE 2

The light-reflectivity of the second light-reflecting material layer usable for the radiation detector of the present invention was studied. In FIG. 4, light-reflectivity of a case in which vapor-deposition films of gold, silver, copper, aluminum or Al-50 wt. % Ag, are used as the second light-reflecting material layer, and a case in which the light-reflecting material layer contains titanium oxide powder (average particle size: 0.3 μm) in the polyester resin at a weight ratio of 3:1, is shown with respect to light wavelength. In case of metal light-reflecting material layer, it is formed by a vacuum vapor-deposition so that the thickness thereof becomes 1 μm. In addition, when Al-50 wt. % Ag is vacuum vapor-deposited, because of the vapor pressure of the metals, Ag is vapor-deposited on the surface of the scintillator element faster than Al, thereby, when the light-reflecting material layer is viewed from the side of the scintillator element, the deposition film is the same as an Ag layer. In addition, the thickness of the light-reflecting material composed of polyester resin blended with titanium oxide powder was set to 100 μm.

As the scintillator material used for a scintillator element, $CdWO_4$ (sometimes referred to as CWO), $Gd_2O_2S$:Pr (Ce, F) (sometimes referred to as GOS), and $(Y, Gd)_2O_3$:Eu (sometimes referred to as YGO) are included, and the wavelengths of scintillation light scintillated by the scintillator materials are 460 nm, 512 nm, and 610 nm, respectively, and the scintillation light is visible radiation. Films made of gold, silver, copper, aluminum and alloy thereof have light-reflectivity of more than 88% with respect to visible radiation within a wavelength range of 380 nm to 770 nm. Since the light-reflectivity of gold and copper abruptly decreases with respect to light having a wavelength of less than 600 nm due to colors thereof, it is necessary for gold and copper to be used in combination with a scintillator material scintillating scintillation light of 600 nm or more.

Even for a light-reflecting material made of polyester resin blended with titanium oxide powder, when its thickness is 100 μm, the light-reflectivity is more than 90%. However, since scintillation light entering the polyester resin is absorbed and attenuated, the quantity of returning light cannot be evaluated only by the light-reflectivity. Further, when the film thickness of the polyester resin blended with titanium oxide powder is made less than 100 μm, the film cannot be formed with a uniform thickness. If the gap width between the scintillator elements is 100 μm, as in the radiation detector described in EXAMPLE 1, a light-reflecting material layer of more than 100 μm thick cannot be formed.

On the contrary, if the thickness of the second light-reflecting material layer that is a metal light-reflecting material layer used in the present invention, is set to more than 0.5 μm, the second light-reflecting material layer can be formed with a uniform thickness.

EXAMPLE 3

In a radiation detector of the present invention, as the thickness of a second light-reflecting material layer formed on the side surfaces of a scintillator element increases, the radiation quantity incident at low angle increases. In order to measure the radiation quantity incident at low angle, as shown in FIG. 5A, by attaching a metal lead plate 60 of about 200 μm thick to the top 26 of the scintillator element 22 of the radiation detector, and radiating X ray thereon from above, the output V of the radiation detector was measured. Next, as shown in FIG. 5B, by removing the metal lead plate 60 from the top 26 of the scintillator element 22 of the radiation detector, and radiating X ray of the same intensity thereon from above, the output $V_0$ of the radiation detector was measured. In the detector in FIG. 5B, the output $V_0$ that is the total of the strength of X ray coming into the top of the scintillator element 22 and the strength of X ray coming into the scintillator element 22 through the second light-reflecting material layers 40 attached to the side surfaces of the scintillator element 22, was measured. In the detector in FIG. 5A, since X ray coming into the scintillator element 22 from the top was shielded by the metal lead plate, the output V that is the strength of X ray incident at low angle coming into the scintillator element 22 through the second light-reflecting material layers 40 attached to the side surfaces of the scintillator element 22, was measured.

In FIG. 6, the output ratio (percentage of the output V with respect to the output $V_0$) by radiation incident at low angle with respect to second light-reflecting material layer thickness (μm) is shown. As is clear from FIG. 6, as the thickness of the second light-reflecting material layer increases, the output by radiation incident at low angle increases, however, if the thickness of the second light-reflecting material layer is equal to or less than 5 μm, the output by radiation incident at low angle is less than 2%. Therefore, it is clear that the thickness of the second light-reflecting material layer should be equal to or less than 5 μm. Moreover, if the thickness of the second light-reflecting material layer is set to be less than 3 μm, the output by radiation incident at low angle can be made to be equal to or less than 1%, however, when the metal light-reflecting material layer is formed by sputtering or vapor-deposition, the thickness is preferably less than 2 μm because of the relation with film forming time. When the metal light-reflecting material layer is formed by sputtering or vapor-deposition, if the thickness is more than 0.05 μm, a uniform thickness metal film can be formed, and the light-reflectivity does not change largely with a thickness of more than 0.05 μm. Therefore, the thickness of the second light-reflecting material layer is set to 0.05 μm to 5 μm, preferably, 0.05 μm to 3 μm.

EXAMPLE 4

The radiation detector described in EXAMPLE 1 was manufactured by the process described below. A semiconductor light-detecting element array 10 having a lengthwise dimension of 75 mm and breadth-wise dimension of 23 mm was prepared. In the array 10, as shown in FIGS. 1 and 3, 1024 pieces of semiconductor photo-detecting elements 15 are arranged lengthwise in sixty four and breadth-wise in sixteen rows on a plane. The semiconductor photo-detecting element 15 had a lengthwise dimension of about 1.07 mm and a breadth-wise dimension of about 1.14 mm, and the gap between the semiconductor photo-detecting elements had a lengthwise dimension of about 100 μm and a breadth-wise dimension of about 297 μm.

Figure 7A:
FIG. 7A is a perspective view of a scintillator plate.
Figure 7B:
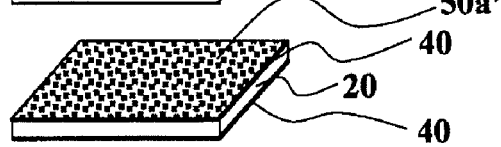
FIG. 7B is a perspective view showing the scintillator plate with a first radiation shielding material layer plastered on a second light-reflecting material layer.

Sixteen scintillator plates 20 (1.14 mm thick) made of $Gd_2O_2S$:Pr (Ce, F) shown in FIG. 7A were prepared, aluminum film was formed on the both surfaces of the scintillator plates with a thickness of 2 μm by sputtering, and scintillator plates 20 of which both surfaces were provided with the second light-reflecting material layer 40, were manufactured (refer to FIG. 7B). In addition, the thickness of the scintillator plates 20 being about 1.14 mm, is equivalent to the breadth-wise dimension of each semiconductor photo-detecting element possessed by the semiconductor photo-detecting element array 10.

On one of the second light-reflecting material layers 40 of each of the sixteen scintillator plates 20 having the second light-reflecting material layers 40, a first radiation shielding material 50a' that is a polyester resin blended with about 95 wt. % of niobium particles was uniformly plastered. The first radiation shielding material 50a' contained niobium particles having a diameter of 290 μm to 296 μm and niobium particles having a smaller diameter at a weight ratio of 39:151.

Figure 7C:
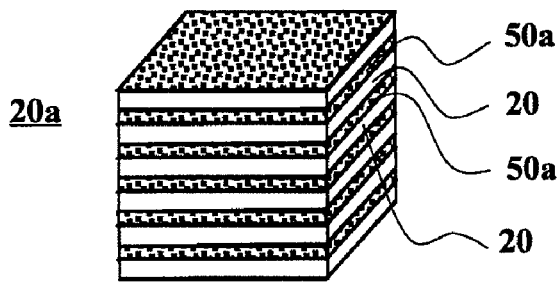
FIG. 7C is a perspective view showing a scintillator block made by piling the scintillator plates plastered with the radiation shielding material on one of the second light-reflecting material layers.

As shown in FIG. 7C, by piling the sixteen scintillator plates 20 plastered with the first radiation shielding material 50a' to alternate with the first radiation shielding material 50a', and heating them at 80° C. for two hours to cure the polyester resin, a scintillator block 20a was formed. The scintillator block 20a had a radiation shielding material layer 50a that was a cured first radiation shielding material 50a' and had a thickness of about 293 μm, between the second light-reflecting material layers 40 of the scintillator plate 20, and had a thickness of about 23 mm, which was substantially the same dimension as the breadth-wise dimension of the semiconductor photo-detecting element array 10.

Figure 7D:
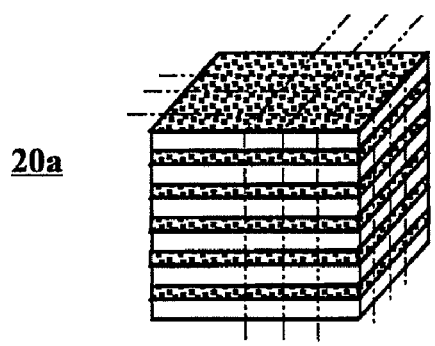
FIG. 7D is an explanatory perspective view showing slicing directions of the scintillator block.

As shown in FIG. 7D, by slicing the scintillator block 20a breadth-wise into sliced plates so that the thickness thereof became the lengthwise dimension (about 1.07 mm) of the semiconductor photo-detecting element 15. Further, as shown in FIG. 7D, by slicing the sliced plates in a direction perpendicular to the former sliced direction, sliced pieces 20b were manufactured, whose dimension (about 2 mm) was larger than the height (1.5 mm) of the completed scintillator element 22. In addition, in FIG. 7D, slicing lines are shown by dashed-two dotted lines.

Here, after slicing the scintillator block 20a into the sliced plates of a thickness equivalent to the lengthwise dimension of the semiconductor photo-detecting element 15, the sliced pieces 20b was manufactured, whose dimension was larger than the height of the completed scintillator element 22, however, by reversing the order, after slicing the scintillator block 20a into sliced plates having a dimension larger than the height of the completed scintillator element 22, the sliced pieces 20b may be manufactured, which has a dimension equivalent to the lengthwise dimension of the semiconductor photo-detecting element 15.

Figure 7E:
FIG. 7E is a perspective view of a sliced piece made by slicing the scintillator block.

In this manner, sixty four sliced pieces 20b were prepared for each radiation detecting device to be manufactured (refer to FIG. 7E). By sputtering aluminum on both end faces (areas: 23 mm×2 mm) of the sliced piece 20b with a distance (about 1.07 mm) between the end faces which is equivalent to the lengthwise dimension of the semiconductor photo-detecting element 15, a second light-reflecting material layer 40 made of aluminum having a thickness of 2 μm was formed (refer to FIG. 7F).

Figure 7F:
FIG. 7F is a perspective view of the sliced piece with second light-reflecting material layers formed on both sides and with second radiation shielding material plastered on one of the sides.

On one of the second light-reflecting material layers 40 made of aluminum on each sliced piece 20b, a second radiation shielding material 50b' that is a polyester resin blended with about 95 wt. % of niobium particles was uniformly plastered (refer to FIG. 7F). The second radiation shielding material 50b' contained niobium particles of 93 μm to 99 μm in diameter and niobium particles of a smaller diameter at a mixing weight ratio of 36:2024.

Figure 7G:
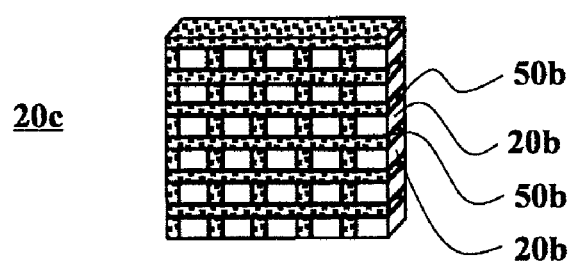
FIG. 7G is a perspective view of a scintillator element block made by piling the sliced pieces with the second radiation shielding material plastered.
Figure 7H:
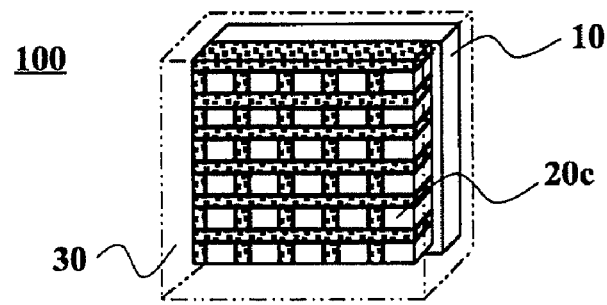
FIG. 7H is a perspective view of a radiation detector, with transparence of a first light-reflecting material layer, which is made by bonding the scintillator element block shown in FIG. 7G to a semiconductor photo-detecting element array and plastering surfaces around the scintillator element block with first light-reflecting material.

As shown in FIG. 7G, by piling the sixty four sliced pieces 20b plastered with the second radiation shielding material 50b' to alternate the sliced pieces 20b with the second radiation shielding material 50b', and heating them at 80° C. for two hours, a scintillator element block 20c was formed. The scintillator element block 20c had radiation shielding material layers 50b of about 96 μm thick that were made by curing the second radiation shielding materials 50b' and interposed between the second light-reflecting material layers 40 on the sliced pieces 20b, and had an entire length of about 75 mm, and substantially a same breadth-wise dimension as the breadth-wise dimension of the semiconductor photo-detecting element array 10.

Both end faces of the scintillator element block 20c was polished to be of 1.5 mm high of the scintillator elements to be completed, and one of polished end faces of the scintillator element block 20c was adhered to the semiconductor photo-detecting element array 10 with epoxy resin so that each of the scintillator elements 22 faces each of the semiconductor photo-detecting elements 15.

By plastering the first light-reflecting material that is a polyester resin blended with titanium oxide powder (average particle size: 0.3 μm) at a weight ratio of 3:1 on all faces (including the top) of the scintillator element block 20c that do not face to the semiconductor photo-detecting element array 10 and curing the first light-reflecting material, a radiation detector 100 (refer to FIG. 711) having first light-reflecting material layers 30 was obtained.

INDUSTRIAL APPLICABILITY

The radiation detector of the present invention is suitable to obtain high-definition photo-images with high resolution which can be used as a multi-channel array radiation detector for a radiation CT device, in particular an X ray CT device.

The invention claimed is:

1. A radiation detector, comprising:
a semiconductor photo-detecting element array having a plurality of semiconductor photo-detecting elements arranged lengthwise and breadth-wise on a plane;
a plurality of scintillator elements arranged on the semiconductor photo-detecting element array to have bottoms of the scintillator elements each fixed to each of the plurality of semiconductor photo-detecting elements;
a first light-reflecting material layer coating a top of each of the scintillator elements opposite to the bottom;
second light-reflecting material layers composed of metal layers covering side surfaces of each of the scintillator elements; and
a radiation shielding material layer composed of resin and particles of a heavy metal element blended in the resin, which radiation shielding material layer is filled between adjacent second light-reflecting material layers covering the side surfaces of the scintillator elements arranged to neighbor on each other,
wherein the radiation shielding material layer consists essentially of 90 wt. % or more of the particles of a heavy metal element selected from Nb to Bi in the Periodic Table and the rest being resin, and
wherein a region of the radiation shielding material layer, which interposes between two adjacent second light-reflecting material layers covering the side surfaces of the scintillator elements neighboring on each other, contains the particles of a heavy metal element that consist of at least three particles of a heavy metal element having diameters within +/−3 μm of a gap width between the two adjacent second light-reflecting material layers and the rest of the particles of a heavy metal element having diameters less than those of the at least three particles of a heavy metal element.

2. A radiation detector, comprising:
a semiconductor photo-detecting element array having a plurality of semiconductor photo-detecting elements arranged lengthwise and breadth-wise on a plane;
a plurality of scintillator elements arranged on the semiconductor photo-detecting element array to have bottoms of the scintillator elements each fixed to each of the plurality of semiconductor photo-detecting elements;
a first light-reflecting material layer coating a top of each of the scintillator elements opposite to the bottom;
second light-reflecting material layers composed of metal layers covering side surfaces of each of the scintillator elements; and
a radiation shielding material layer composed of resin and particles of a heavy metal element blended in the resin, which radiation shielding material layer is filled between adjacent second light-reflecting material layers covering the side surfaces of the scintillator elements arranged to neighbor on each other,
wherein the second light-reflecting material layer is made of gold, silver, copper, aluminum or alloy thereof and is 0.05 μm to 5 μm thick,
wherein the radiation shielding material layer consists essentially of 90 wt. % or more of the particles of a heavy metal element selected from Nb to Bi in the Periodic Table and the rest being resin, and
wherein a region of the radiation shielding material layer, which interposes between two adjacent second light-reflecting material layers covering the side surfaces of the scintillator elements neighboring on each other, contains the particles of a heavy metal element that consist of at least three particles of a heavy metal element having diameters within +/−3 μm of a gap width between the two adjacent second light-reflecting material layers and the rest of the particles of a heavy metal element having diameters less than those of the at least three particles of a heavy metal element.

3. A method for producing a radiation detector, comprising the steps of:
providing a semiconductor photo-detecting element array that has a plurality of semiconductor photo-detecting elements arranged lengthwise and breadth-wise on a plane, and a plurality of scintillator plates that have a thickness equivalent to one of lengthwise and breadth-wise dimensions of the semiconductor photo-detecting elements disposed in the semiconductor photo-detecting element array, a length more than the other of the lengthwise and breadth-wise dimensions of the semiconductor photo-detecting elements and a width more than a height of scintillator elements to be completed;
sputtering or vapor-depositing gold, silver, copper, aluminum or alloy thereof on both sides of the scintillator plates to form second light-reflecting material layers of 0.05 μm to 5 μm thick on the both sides;
plastering a radiation shielding material composed of resin blended with particles of a heavy metal element on one of the second light-reflecting material layers formed on the both sides of the scintillator plates;
piling the scintillator plates plastered with the radiation shielding material to alternate the scintillator plates with the radiation shielding material, and curing the radiation shielding material to form radiation shielding material layers and to form scintillator blocks having thickness equivalent to one of lengthwise and breadth-wise dimensions of the semiconductor photo-detecting element array;

slicing the scintillator blocks into sliced pieces with length equivalent to the other of the lengthwise and breadth-wise dimensions of the semiconductor photo-detecting elements and width more than the height of the scintillator elements to be completed;

sputtering or vapor-depositing gold, silver, copper, aluminum or alloy thereof on both cut sides of the sliced pieces made from the scintillator blocks to form other second light-reflecting material layers of 0.05 μm to 5 μm thick on the both cut sides;

plastering a radiation shielding material composed of resin blended with particles of a heavy metal element on one of the other second light-reflecting material layers formed on the both cut sides of the sliced pieces;

piling the sliced pieces plastered with the radiation shielding material to alternate the sliced pieces with the radiation shielding material, and curing the radiation shielding material to form radiation shielding material layers and to form a scintillator element block having the length equivalent to the other of the lengthwise and breadth-wise dimensions of the semiconductor photo-detecting element array; and polishing both end faces (top and bottom) of the scintillator element block to the height of the scintillator elements to be completed and fixing one of polished end faces of the scintillator element block to the semiconductor photo-detecting element array so that each of the scintillator elements faces each of the semiconductor photo-detecting elements.

4. A method for producing a radiation detector as set forth in claim 3, further comprising the steps of:

after the polishing of the both end faces of the scintillator element block, plastering a second light-reflecting material composed of resin blended with titanium oxide powder on other faces of the scintillator element block except for a face adhering to the semiconductor photo-detecting element array and curing the second light-reflecting material to form a second light-reflecting material layer.

* * * * *